United States Patent [19]

Mc Taggart

[11] Patent Number: 5,167,508
[45] Date of Patent: Dec. 1, 1992

[54] ELECTRONIC BOOK

[76] Inventor: Stephen I. Mc Taggart, 330 E. Sharon Dr., Phoenix, Ariz. 85022

[21] Appl. No.: 685,278

[22] Filed: Apr. 14, 1991

Related U.S. Application Data

[63] Continuation-in-part of Ser. No. 396,129, Aug. 21, 1989, abandoned.

[51] Int. Cl.$^5$ .............................................. G09B 5/00
[52] U.S. Cl. ................................ 434/317; 434/308; 40/452; 40/475; 362/98
[58] Field of Search ............... 434/317, 308, 178, 179; 40/452, 475; 362/98, 155, 253; 281/18, 22

[56] References Cited

U.S. PATENT DOCUMENTS

| | | | |
|---|---|---|---|
| 1,545,217 | 7/1925 | Thurber | 281/18 X |
| 1,670,254 | 5/1928 | Gowin | 281/18 |
| 2,277,318 | 3/1942 | Grant | 281/22 |
| 2,444,355 | 6/1948 | Kniznick | 281/22 |
| 3,592,098 | 7/1971 | Zadig | 84/483.1 |
| 4,209,824 | 6/1980 | Kaufman | 362/98 |

*Primary Examiner*—Robert Bahr
*Assistant Examiner*—J. Doyle
*Attorney, Agent, or Firm*—Antonio R. Durando; Harry M. Weiss

[57] ABSTRACT

An electronic book apparatus that comprises multiple pages with printed information, visual signal means for identifying the printed information in a sequentially organized manner, synchronized audio signal means for describing or further identifying the information concurrently with the visual signal means, and electromechanical or photo-sensitive means for electronically controlling the generation and transmission of these signals when each particular page is opened for viewing. Each page of the electronic book includes a laminated sheet, on which the printed material is arranged, and an electronic backdrop containing the visual signal means for display through the laminated sheet. Separate intelligent electronic means in the spine and top portion of the book, coupled to the electrical or photo-sensitive means, activate the illuminating circuitry and a voice synthesizer that are synchronized and sequenced to produce a concurrent visual and audio enhancement of the printed matter being viewed on the page. The apparatus controls the presentation in a predetermined sequence deemed appropriate to enhance comprehension of the material and, if desired, provide entertainment. In one embodiment of the invention, the user is provided at each page with alternative options to repeat certain sequences or continue through the book.

37 Claims, 4 Drawing Sheets

ELECTRONIC BOOK

RELATED APPLICATIONS

This application is a continuation-in-part of U.S. application Ser. No. 396,129, filed by the same inventor on Aug. 21, 1989, now abandoned.

BACKGROUND OF THE INVENTION

1. Field of the Invention

This invention relates to the general field of apparatus and methods for combining audio and visual signals for displaying information. Specifically, the present invention relates to apparatus and methods for enhancing the comprehension and retention of information displayed in a book by combining visual and audio messages with the presentation of printed material.

2. Description of the Prior Art

Comprehension of printed matter is a high-priority educational objective of modern society. It is known that comprehension of all printed material depends on the viewer's ability to interpret visually perceivable information in accordance with previously acquired knowledge associated with that information. Accordingly, various attempts have been made at producing aids to enhance the process of interpretation of such visually perceived information in order to improve its comprehension and assimilation.

Among the various devices found in prior art, U.S. Pat. Nos. 4,021,932 to Lipps (1977), No. 4,189,852 to Chatlien (1980), No. 4,273,538 to Ross (1981), No. 4,425,098 to Doring (1984), No. 4,752,230 to Shimizu (1988), No. 4,778,391 to Weiner (1988), and No. 4,809,246 to Jeng (1989) disclose several approaches utilized to provide effective highlighting of printed material, either for amusement purposes or for improving the comprehension and retention of a reader. U.S. Pat. No. 4,809,246, in particular, teaches a sound-illustrated book that utilizes a page sensing element that triggers an audio recording of the printed matter on the page being viewed.

In U.S. Pat. No. 4,703,573 (1987), Montgomery et al. disclose an electronic book apparatus with audio and visual components for electronically generating and transmitting a combination of sound and electronic images to identify the information displayed on an open sheet. Control circuitry is provided on the sheet to coordinate the functioning of the audio and visual displays according to a predetermined sequence considered appropriate to enhance understanding of the material. Similarly, U.S. Pat. No. 4,363,081 to Wilbur (1982) describes the use of light emitting diode (LED) components to highlight drawings and other printed matter in greeting cards.

A review of the prior art shows that most devices developed to date merely present an audio recording of printed matter illustrated on a page. Others appear to limit the audio enhancement to just printed words or printed images. Most importantly, though, the various kinds of apparatus used in prior art are not practical for bound book format because of the space requirements associated with the use of LED's or of illumination devices, such as liquid crystal displays (LCD's), for providing the required visual enhancement. Moreover, the approaches taught in prior art to control the functioning of both the audio and the visual displays are specific to the requirements of each page and, therefore, not suitable for voluminous multipage applications. Finally, no existing electronic book utilizes visual and audio messages in interactive fashion with the reader to illustrate the printed material.

Therefore, there still exists a need for practical apparatus wherein visual information, presented in any character or image form on a page of a book (hereinafter referred to generally as printed matter, material, or information), is enhanced by sound and light displays systematically synchronized with the information to stress its meaning and improve comprehension and retention on the part of a reader. In particular, there is a need for a compact method of production that is suitable for assembling many pages into a single bound book in an economical and practical manner.

SUMMARY OF THE INVENTION

In view of the foregoing, the primary objective of this invention is to provide an electronic book apparatus that produces visual and audio enhancement of printed information.

Another objective of the invention is to provide an electronic book apparatus that produces visual signals in conjunction with the display of the printed information in the book in order to highlight and draw attention to it.

A further goal of the invention is to provide an electronic book apparatus that also produces an audio signal, or message, in conjunction with the display of the printed information in the book in order to describe and facilitate the reader's recognition and understanding of the material.

Another goal of the invention is to provide synchronization between the audio and visual signals in connection with any portion of the printed information to which they pertain, so as to clearly focus the attention of the viewer on the particular portion of interest and improve his or her comprehension of the material viewed.

Still another objective is the sequential delivery of the synchronized audio and visual messages according to a predetermined schedule appropriately chosen for educational or entertainment purposes.

A related object of the invention is an interactive system whereby the reader of the book can chose between alternatives to best suit his or her interest, so that the reader's attention can be further stimulated by direct involvement in the viewing progression through the material in the book.

A further objective of the invention is the ability to apply the same general concept in a variety of designs and physical embodiments to fit different implementation formats, as may be desired for different kinds of printed information. To that end, the apparatus described herein can be implemented in modular form, wherein each page of a book constitutes a modular component of the overall apparatus.

Yet another objective of this invention is the realization of the above mentioned goals in an economical and commercially viable manner. This is done by utilizing simple components and methods of manufacture that are either already available in the open market or can be developed at competitive prices.

In accordance with these and other objectives, one embodiment of the present invention provides an electronic book apparatus that comprises multiple pages with printed information, visual signal means for identifying the printed information in a sequentially organized manner, synchronized audio signal means for describing or further identifying the information concurrently with the visual signal means, and electrical or photo-sensitive means for electronically controlling the generation and transmission of these signals when each particular page is opened for viewing. Each page of the electronic book includes a laminated sheet, on which the printed material is arranged, and an electronic backdrop containing the visual signal means for display through the laminated sheet. Separate intelligent electronic means in the spine and top portion of the book, coupled to the electrical or photo-sensitive means, activate the illuminating circuitry and a voice synthesizer that are synchronized and sequenced to produce a concurrent visual and audio enhancement of the printed matter being viewed on the page. The apparatus controls the presentation in a predetermined sequence deemed appropriate to enhance comprehension of the material and, if desired, provide entertainment. In one embodiment of the invention, the user is provided at each page with alternative options to repeat certain sequences or continue through the book.

Various other purposes and advantages of the invention will become clear from its description in the specifications that follow, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only one of the various ways in which the invention may be practiced.

DETAILED DESCRIPTION OF THE INVENTION

The heart of this invention lies in the novel method of manufacture of an electronic book that permits the combination of visual and audible signal circuitry in compact format for use in voluminous publications. In one embodiment, the book consists of a continuous sheet of circuitry folded in accordion fashion and bound at one end to form leaves and corresponding pages. In the preferred embodiment, the circuitry corresponding to each pair of facing pages (spread) or, in the alternative, to each book leaf constitutes a module that is made functional by connection with a separate control board through flexible printed circuitry in the spine of the book.

Figure 1:
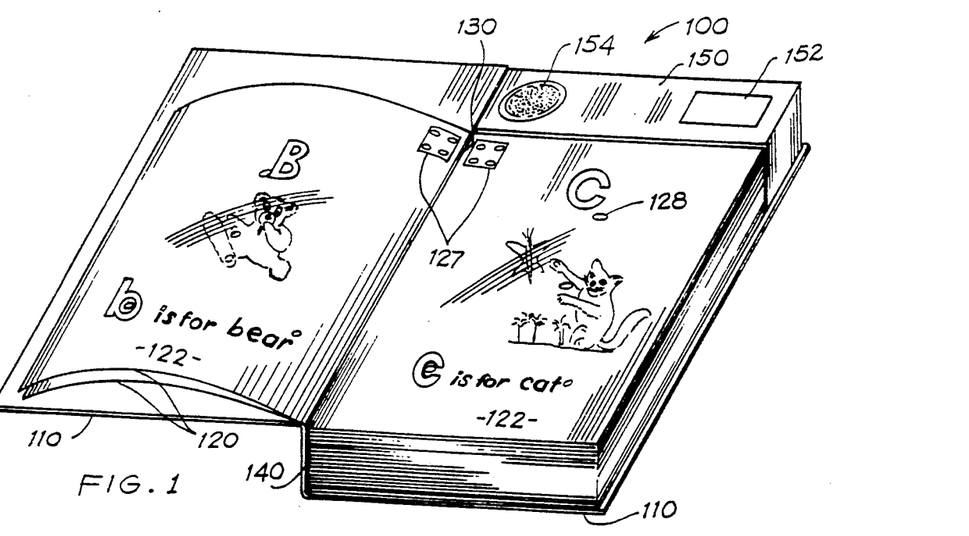
FIG. 1 is a perspective view of one embodiment of the present invention showing the general configuration of the electronic book and illustrating an open spread with alphabet letters and pictorial representations of related subject matter.
Figure 2:
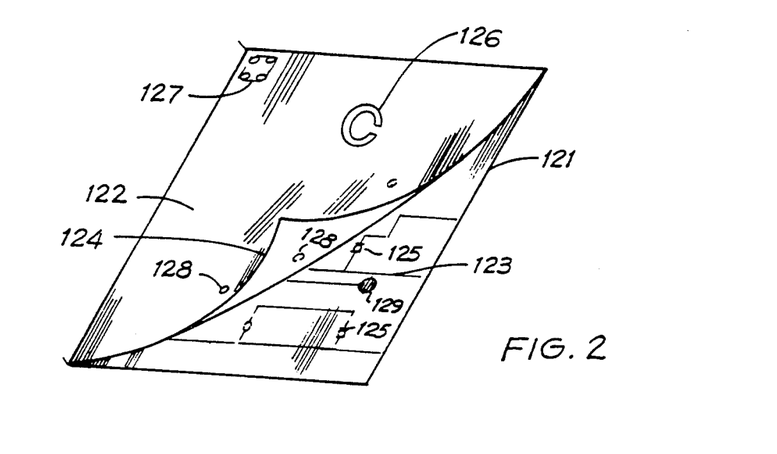
FIG. 2 illustrates the laminated construction of a book page exposing a circuit board layer sandwiched between a top sheet bearing visual information and a bottom support sheet.

Referring now to the drawings, wherein like parts are designated throughout with like numerals and symbols, FIG. 1 illustrates an electronic book 100 according to the present invention. The book comprises a cover 110 for covering and binding a multiplicity of laminated leaves 120 bound at the inside margin 130 to form a spine 140. The cover 110 includes a head portion 150 that incorporates the electronic control circuitry of the book (not shown in FIG. 1), a battery compartment 152, and a speaker 154. Each page 122 of the book 100 consists of a laminated assembly, as illustrated in FIG. 2. A top sheet 124 bears visual information 126 in the form of printed images, alphabetical characters or other material suitable for affixation to a flat book page. A bottom or core sheet 121 bears a circuit board layer 123 attached to the face of the sheet itself and including light emitting diodes (LED's) 125 corresponding to either translucent portions or apertures 128 in the top sheet 124 for visual accessibility when the page 122 is assembled in its laminated form. Although obviously not visible in the figure, the page on the back side of FIG. 2 consists of the same structural components and also has a two-sheet laminated configuration, with a top sheet bearing printed information and a bottom sheet, normally the same core sheet for both pages, bearing a corresponding circuit board layer.

Figure 3:
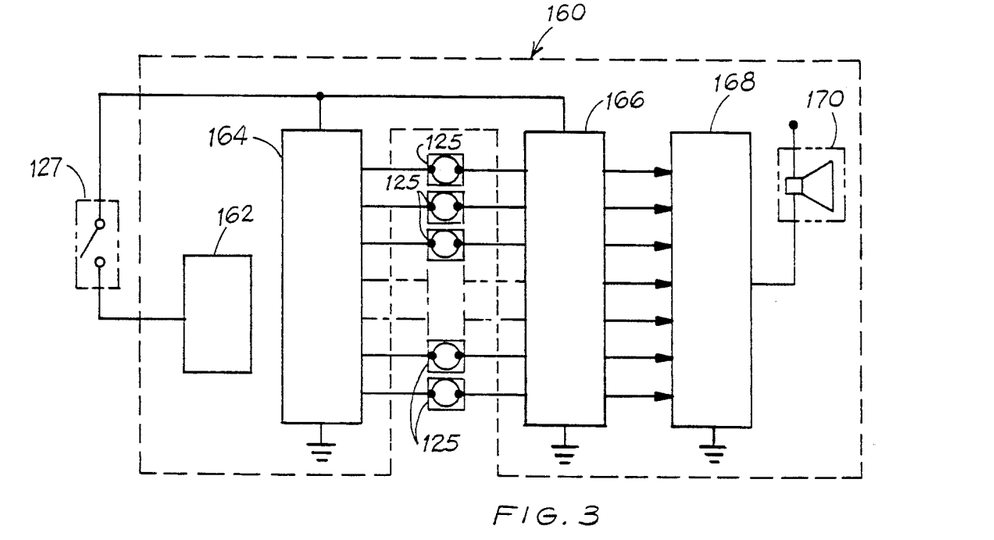
FIG. 3 is a block diagram illustrating the electronic components of the intelligent circuitry of the book of the invention.

As explained in detail in the referenced copending application and in several prior art patents, the circuit board layer 123 is provided with an electromechanical contact switch or a photosensitive switch 127 that extends through the top sheet 124 to initiate the operation of the electronic book 100 when it is opened to the corresponding page. The switch 127 on the page electronically generates and transmits an identifying signal through that page's circuit board layer 123 to separate intelligent electronic circuitry 160 stored in the head portion 150 of the book. As shown in block form in FIG. 3, this circuitry comprises a power source 162 (provided in the form of a battery stored in compartment 152 of the book) which, through the activating switches 127 in each page, energizes sequencer means 164, synchronizer means 166, and voice synthesizer means 168 coupled to audio means 170, which normally consists of a speaker 154 (illustrated in FIG. 1). The power source 162 and the audio means 170 are preferably packaged inconspicuously in the head portion 150 of the book and are electrically coupled to the electronic circuitry 160 and to the circuit board layer 123 of each page through appropriate interconnecting circuitry (not shown in the figures) in a manner that would be obvious to those skilled in the art. The audio means 170 may consist of headphones (also not shown) for personal private listening while viewing the material contained in the book.

In operation, whenever the book 100 is opened to form a spread of two adjacent pages, as illustrated in FIG. 1, the switch 127 on the left page is first activated to begin a sequence of visual and audible signals associated with the material presented on that page. The activating switch 127 of the circuit may function strictly by contact, as illustrated by the switches on opposite pages in FIG. 1, so that an open circuit is created by lifting a page and separating adjacent components that otherwise form a normally-closed assembly. On the other hand, the switch 127 may consist of any spring-loaded switching device, or of any photoelectric element responsive to the light received when the book is opened (this embodiment, of course, would not work in the dark). The activation of the switch 127 on the left page causes the sequencer 164 and the synchronizer 166 to operate and illuminate selected portions of the printed matter 126 by means of corresponding LED's 125 on that page and, concurrently, to deliver voice messages for interpretation of the printed matter through the voice synthesizer 168 and the audio means 170, all in accordance with a predetermined order and interval of presentation. The layout of the circuit board layer 123 corresponding to the activated left page determines the physical location of the visual signals produced by the LED's and visible through the translucent portions or apertures 128 in the top sheet 124 of that page. Of course, these locations may be the same or vary from page to page according to the specific requirements for the material being displayed. In fact, the sequencer and synchronizer can be programmed through micro-chip integrated circuitry according to methods well known in the art to perform any sequence of visual and audio signal combinations in a way tailored to produce maximum enhancement of the material presented. In addition, the program may include alternative or repetitive sequences for the viewer's choice, to be implemented by pressure switches 129 incorporated into the circuit board 123 of each page. Thus, for instance, at a certain point in the sequence of signal delivery, an audible message would inform the reader of alternative progression choices in response to specific instructions communicated by the reader through the pressure switch 129 (which, in turn, could correspond to a recognizable feature in the displayed printed material). For example, after a series of light and sound signals associated with the display of the printed image of a bear on the page, a message would be heard instructing the viewer to press the bear's nose once to repeat, twice to play a game, or not at all to continue to the next page. The game could consist of any light and sound combination of signals deemed appropriate for the desired purposes and any level of interaction could be designed into the programmed sequence by requiring appropriate responses through additional pressure switches 129 similarly located to correspond to points of interest throughout the page.

When the logic of possibilities on the left page is exhausted, as determined by the specific program for the book, the sequencer 164 automatically starts a similar series of audible and visual signals for the adjacent right page in conjunction with the presentation of its printed material. The sequence of signals for each page may be the same or different, depending on the preprogrammed instructions, but it always contains light and sound signals designed to maximize the reader's understanding and retention of the printed material. At the conclusion of the sequence for the right page, the apparatus stops (unless forced to repeat by the reader in response to an available option) until a new switch 127 is activated by the turning of a page.

While audio and visual displays similar to the one described above are known in the art, the method and apparatus of the present invention are particularly suitable for multi-leaf compilation. The approach used here utilizes novel methods for connecting the circuit board layer 123 of each page to the intelligent electronic circuitry 160, which results in a more compact design and added versatility. A novel approach is also utilized in placing LED's in the circuit board layer of each page in a way that minimizes the thickness of the page.

Figure 4:
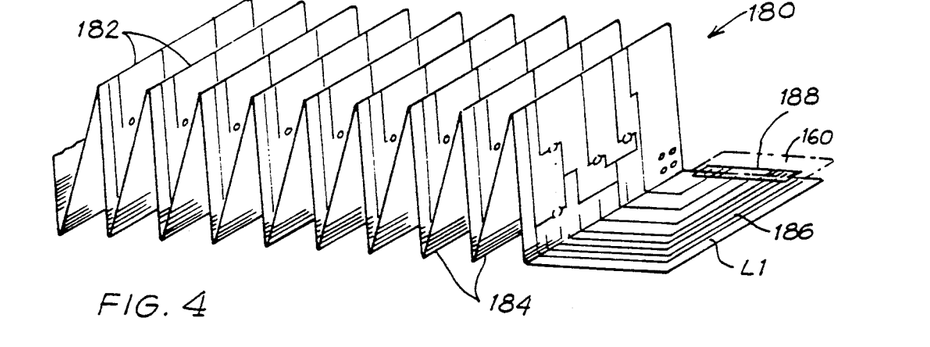
FIG. 4 is a perspective view of a continuous core sheet used to form the leaves of the electronic book according to one embodiment of the invention.
Figure 5:
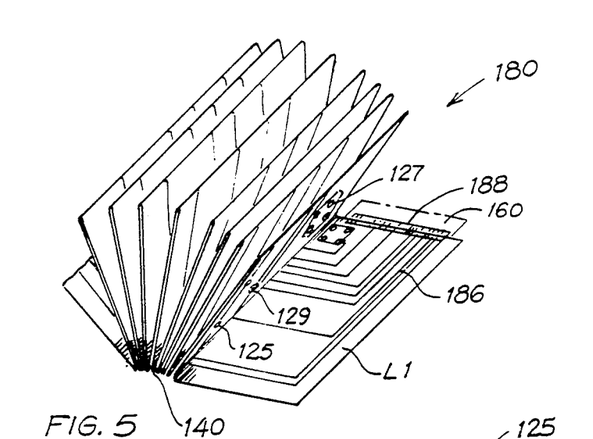
FIG. 5 is a perspective view of the continuous core sheet of FIG. 4 after assembly into book-leaf form.

As illustrated in FIG. 4 for one embodiment of the invention, a continuous circuit board 186 for the entire book is printed on one side (the top side in FIG. 4) of a continuous core sheet 180 by means of flexible conductive ink. The core sheet 180 is then folded into equal segments in accordion fashion to form book leaves consisting of pairs of adjacent segments, of which the inside folds 184 are bound to constitute the book's spine 140, while the outside folds 182 constitute the outer edges of the book's pages. FIG. 5 illustrates the way the continuous sheet 180 is assembled into book-leaf form. As seen in both FIGS. 4 and 5, a master board 188 is provided to connect the circuit board 186 to the intelligent electronic circuitry 160 housed in the head portion 150 of the book's cover through the last segment L1 of the core sheet 180. LED's 125, contact or photo-sensitive switches 127, and pressure switches 129 are incorporated into the continuous circuit board 186 in the same manner as in the individual page application described in FIG. 2. Finally, each page formed from the continuous core 180 is laminated with matching printed material with translucent portions or apertures 128 corresponding to each LED in the circuit board layer of the book. Thus, the circuit board 186 is covered throughout the book by sheets 124 containing printed material and translucent portions or apertures 128 for each underlying LED.

In an equivalent configuration not shown in the figures, the circuit board 186 is printed on the back side of the continuous core sheet 180, so that it lays entirely on the back, instead of the front, of each core segment corresponding to a page. In that case, the circuitry becomes sandwiched between pages in the interior of each leaf and, as a result, the LED's are not directly accessible from the front side, which is where the top sheet with printed material is laminated onto the core sheet. Therefore, it is necessary to provide perforations in the core sheet corresponding to each LED, so that it becomes visible through the core sheet and, consequently, through the top sheet carrying printed information. Since this configuration causes adjacent portions of the circuit board to be in direct contact with one another because sandwiched between segments of the board, it is also necessary to protect the circuit board by coating it with a layer of flexible dielectric paint or equivalent insulating material.

The circuit elements of the sequencer 164 and synchronizer 166 are well known commercially available components and, therefore, are not herein described specifically. Note that the sequencing and synchronous control functions may be included in an integrated microprocessor, also well known and within the skills of an artisan in the trade. Similarly, the voice synthesizer 168 may be one of several available speech synthesizers requiring the use of a microprocessor with a memory for storing the speech code, as well as the control code for displaying the visual signals. In one embodiment of the present invention, the sequencer, synchronizer and synthesizer functions were provided by a Texas Instruments TSP-50C-11 speech processor/sequencer in combination with a Signetics CD694067 decoder/multiplexer/expansion sequencer, and a 10 MHZ synchronization crystal, which were programmed according to methods known to those skilled in the art to perform the several functions described herein.

Figure 6:
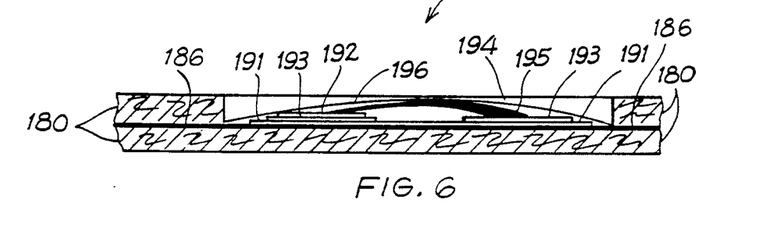
FIG. 6 is a cross-sectional view of a portion of the core sheet of the invention illustrating the construction of a light emitting diode directly on the page of the book.

Another novel characteristic of this invention, suitable for embodiment in any of the configurations adopted for assembling the electronic book, lies in the method of manufacture of the LED structure within the circuit board 186, whereby each component is formed directly in the core sheet 180 of the book. Instead of incorporating commercially available LED's into the fabric of the circuit, it is found that construction of each LED structure 125 directly into the circuit board layer of each page results in significantly lower overall thickness of the page. Thus, as illustrated in the greatly enlarged cross-sectional view in FIG. 6 of an LED site within a leaf of the core sheet 180, using techniques similar to well known methods employed for mass production of LED's, a semiconductor die chip 192 is deposited with the appropriate orientation directly into each LED site in the circuit board layer 186 of one segment the continuous core sheet 180. A base is first prepared for each LED on conductive tape 191 which is then sectioned and attached to the corresponding terminals in the printed circuit board. The tape 191 is adhesive on both sides and laminated on the top side with copper foil 193, appropriately scored in the middle to form two electrically separate copper strips. This kind of conductive adhesive tape is available commercially in a variety of forms produced by the 3M Company of Saint Paul, Minn. The section of tape used on each LED site is oriented so that each copper strip covers one of the terminals in the circuit board 186. The conductivity of tape 191 is directional only, so that a current can flow across but not along the plane of the tape; therefore, the two copper strips 193 are initially electrically insulated from one another, but are connected through the tape 191 to the corresponding circuit board terminals on which they lie, thus forming suitable electrodes for integrating the semiconductor die into the circuit board. A semiconductor die chip 192 is placed on the cathode side and electrically connected and bonded to the anode side by a strand of conductive epoxy resin 195 deposited on the anode side and stretched to make contact with the die chip. In practice, this bonding operation is performed simultaneously on multiple die chips on the tape, which is then cut to yield individual LED components. Each component is then affixed with the appropriate electrical orientation to the printed circuitry of the circuit board and covered with a sufficient amount of nonconductive epoxy resin 196 to bond it to the core sheet 180 and to the conductive ink of the circuit board layer 186. In addition, the resin 196 covering the site tends to acquire a curvature that forms a lens over the light emitting diode, thus further enhancing its effect in providing visual signals to the reader of the book. As explained above, if the circuit board 186 is printed on the back side of the core sheet 180 and each LED is thus constructed on the back side of each segment constituting a page, a corresponding perforation 194 on the adjacent segment of core sheet (both segments forming a book leaf) is required to make the LED visible from the front side of such adjacent segment.

Figure 7:
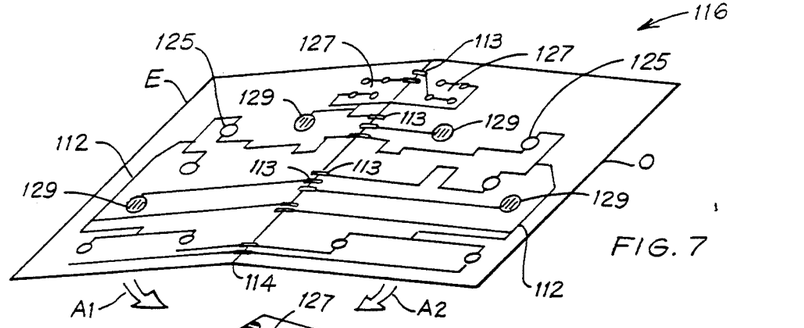
FIG. 7 is a perspective view of a modular core sheet used to form one leaf corresponding to two opposite pages of the electronic book according to another embodiment of the invention.
Figures 8, 9, 10, 11:
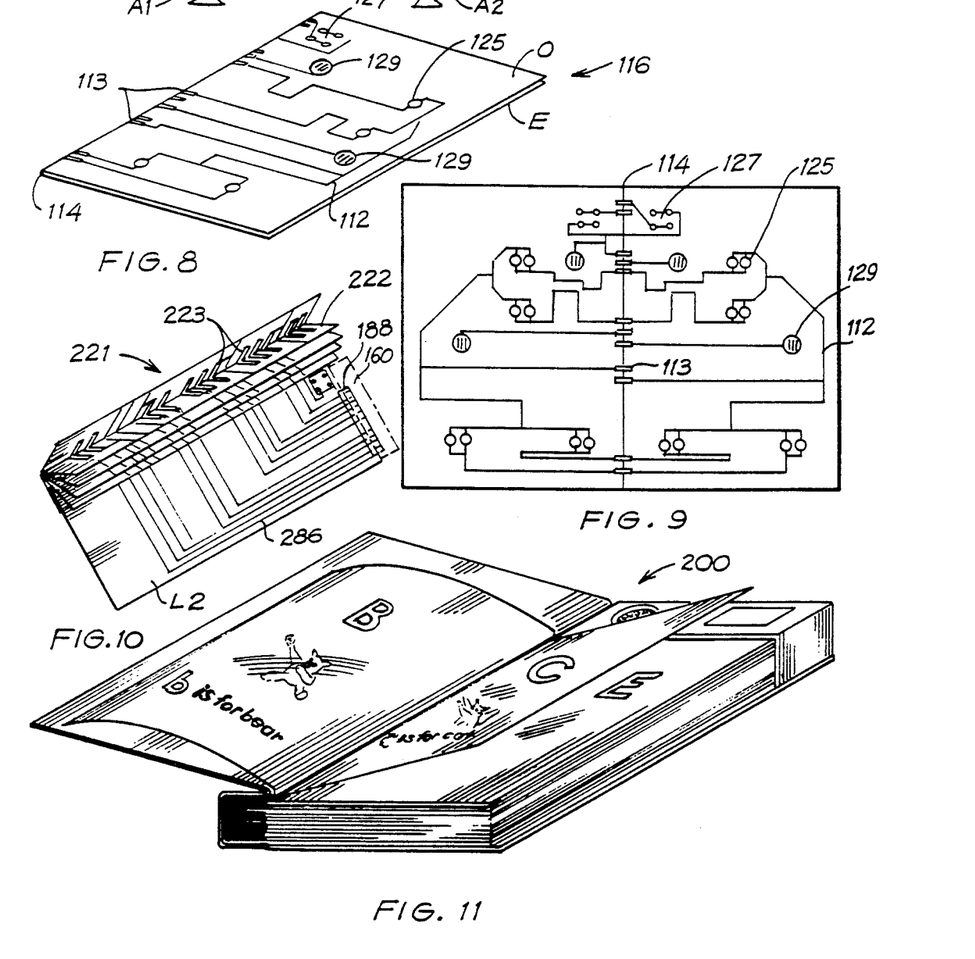
FIG. 8 is a perspective view of the modular core sheet of FIG. 7 after assembly into a modular book leaf.
FIG. 9 is a plan view of an example of a circuit board layer printed on the modular core sheet of FIG. 7 showing conductive paths through the center fold for connection, through the spine of the book, to intelligent electronic circuitry housed in the book cover.
FIG. 10 is a perspective view of a fan-like spine for receiving each modular book leaf, as shown in FIG. 8, between flaps that contain corresponding connections to the control circuitry of the book.
FIG. 11 shows a perspective view of an embodiment of the invention manufactured according to the spine and modular leaf approach illustrated in FIGS. 8 and 10.

In another embodiment of the invention, the circuit board layer of each page is further simplified by a modular approach to the construction of each book leaf. This approach can also take different configurations depending on whether the circuit board layer is printed on the front or the back side of the core sheet for each page. When printed on the front side, as shown in FIG. 7, each leaf of the book consists of one core sheet 116 corresponding to two opposite pages on the same leaf, referred to in the figure as 0 and E for odd and even in reference to conventional page numbering. Each core sheet 116 bears a circuit board layer 112 corresponding to the specific display requirements of the two pages 0 and E, with the same general characteristics described above for the continuous core sheet 180 of FIG. 4. By folding each core sheet 116 in two in the direction of arrows A1 and A2 and along a center fold 114, a book leaf 116 is formed wherein the center fold 114 constitutes the inside margin of each opposite page 0 and E, and wherein each page contains the half of the circuit board layer 112 that pertains to its printed material, as illustrated in FIG. 8. By properly positioning the conductive paths 113 of the circuit board layer 112 across the fold 114, the center fold can be used, through corresponding connections 223 in the spine of the book, as the point of connection to the intelligent electronic circuitry 160 housed in the head portion 150 of the book's cover. An example of one such circuit board layer 112 is shown in FIG. 9.

Therefore, as illustrated in FIG. 10, a specially constructed fan-like spine 221 is provided for receiving each book leaf 116 sandwiched between flaps 222 that contain connections 223 corresponding to the conductive paths 113 for connection to the main brain of the book through a last segment L2 (equivalent to the last segment L1 of the core sheet 180 shown in FIGS. 4 and 5). Like the continuous core sheet 180, the spine 221 is constructed by printing on a single sheet, by means of flexible conductive ink, a continuous circuit board 286 converging to the segment L2, which is designed for connection with the master board 188. The continuous sheet is then folded (except for the segment L2) into equal narrow segments or flaps 222 in accordion fashion to form the spine 221 shown in FIG. 10. Therefore, each modular book leaf 116 is directly connected to the master board 188 through the continuous circuitry printed on the spine 221. FIG. 11 shows a perspective view of an embodiment 200 of the invention manufactured according to the spine and modular leaf approach just described.

One of the advantages of this modular approach is that each pair of pages O and E on the opposite sides of each leaf can be designed independently of the rest of the book, the only constraint being in the points of connection through the spine 221. In addition, if the same circuit board layout is used for all leaves in the book, the modular approach makes it possible to use the same core sheet 116, laminated with different printed material for different pages, for the entire book, thus greatly decreasing the cost of printing individual circuit board layers. By comparison, the versatility of the accordion approach of the first embodiment is limited by the requirement that all the circuitry for the entire set of pages be run through the last page for connection with the single master board 188. This means that the complexity of each individual page is necessarily reflected in the complexity of the circuitry of the last page, where it all converges for connection with the master board. Therefore, the complexity of the circuitry is necessarily affected by corresponding physical space requirements. Moreover, the accordion approach requires that any modification to the circuit board layer 186 be reflected in a manufacturing change to the entire continuous core sheet 180, instead of only one core sheet 116, with obvious cost and versatility drawbacks.

Figure 12:
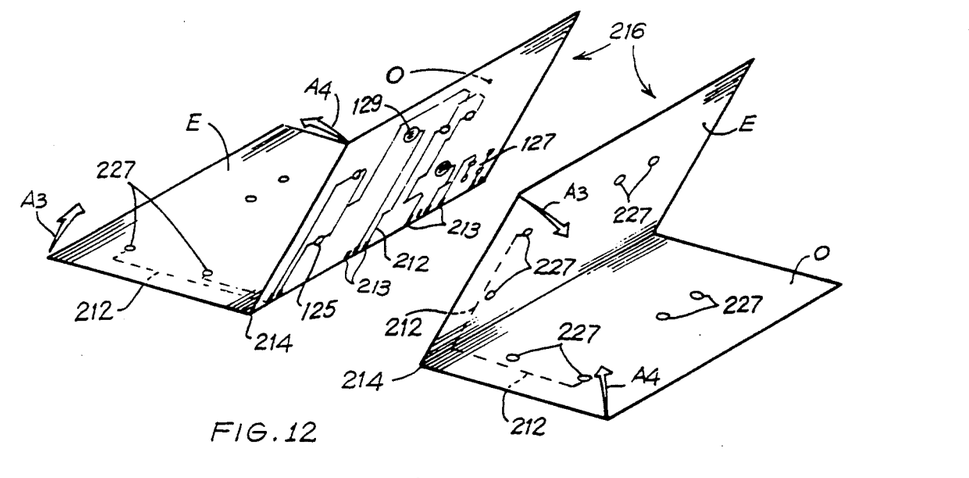
FIG. 12 is a perspective view of another kind of core sheet used to form adjacent modular book spreads, each corresponding to two facing pages, of the electronic book according to yet another embodiment of the invention.
Figure 13:
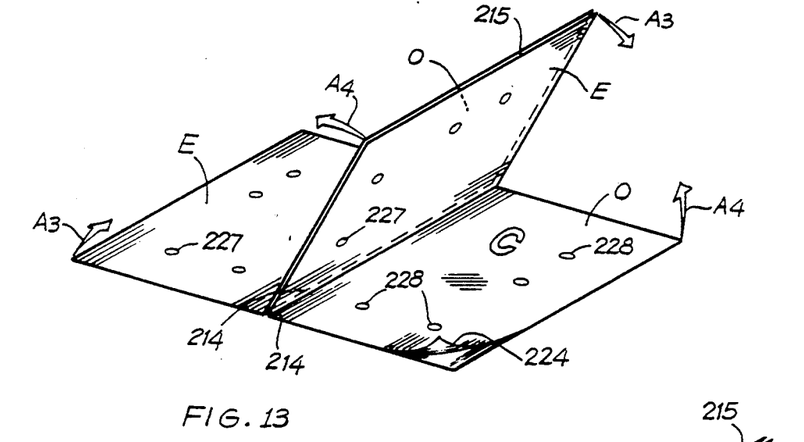
FIG. 13 is a perspective view of the modular core sheets of FIG. 12 after assembly into a book leaf and two corresponding book spreads.

As illustrated in FIG. 12, when the modular approach is used with the circuit board printed on the back side of the core sheet for each page, each spread (instead of leaf) of the book consists of one core sheet 216 corresponding to two facing pages on adjacent leaves, again referred to in the figure as E and O for even and odd in reference to conventional page numbering. Thus, by combining each pair of core sheet modules so that the back sides of opposite pages come together and sandwich their respective portions of the circuit board layer 212, a leaf 215 is formed, as illustrated in FIG. 13. Of course, perforations 227 corresponding to each LED on the sandwiched back side of each page must be provided for visibility. As shown in the right hand page of FIG. 13, a top sheet 224 bearing printed matter and light apertures 228 (or corresponding translucent portions) is then affixed to each page to complete the laminated assembly.

In this configuration of the modular approach, each core sheet 216 bears a circuit board layer 212 corresponding to the specific display requirements of the corresponding pages, again with the same general characteristics described above for the continuous core sheet 180 of FIG. 4. By folding each core sheet 216 in two in the direction of arrows A3 and A4 and along a center fold 214, as seen in FIG. 12, and by joining adjacent parts, as shown in FIG. 13, book leaves 215 are formed wherein the center folds 214 constitute the inside margins of each facing page E and 0, and wherein each page contains the half of the circuit board layer 212 that pertains to its printed material. Since this configuration causes portions of the circuit boards on adjacent core sheets to be in direct contact with one another because sandwiched between segments of adjacent spreads to form book leaves, it may also be necessary to protect the circuit board by coating it with a layer of flexible dielectric paint or equivalent insulating material.

Figure 14:
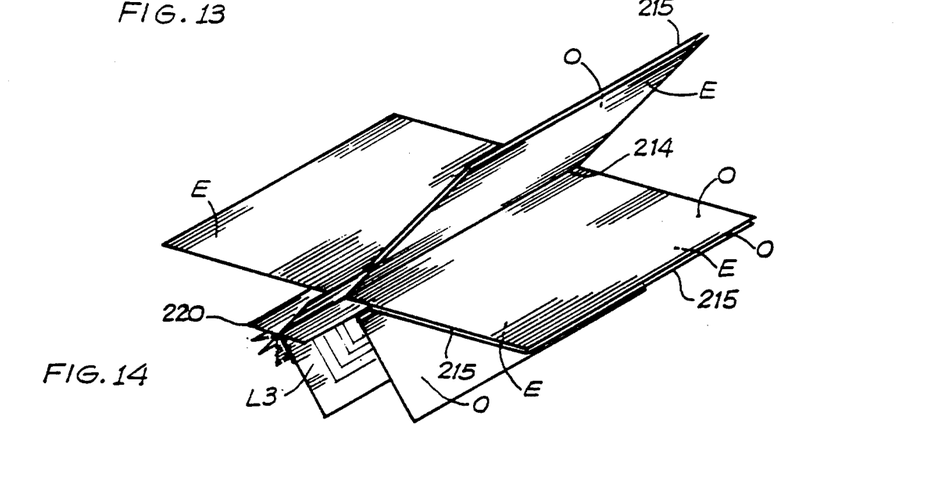
FIG. 14 is a perspective view of a fan-like spine for receiving each modular book spread while being combined to form book leaves, as shown in FIG. 8, between flaps that contain corresponding connections to the control circuitry of the book, wherein the spine is partially extracted for illustration.

In a manner equivalent to the method described above, by properly positioning the conductive paths of the circuit board layer 212 of each sheet across the outside of each fold 214, each core sheet 216 can be plugged in modular form into a matching spine 220 (seen in FIG. 14) equivalent to the spine 221 of FIG. 10. Of course, though, as shown in FIG. 14 where the spine 220 is only partially enmeshed with several core modules for illustration purposes, each module received between sets of flaps consists of one spread of facing pages, rather than one leaf of opposite pages. The spine of the book remains the point of connection, through its last segment L3, to the intelligent electronic circuitry 160 housed in the head portion 150 of the book's cover.

As for the modular leaf approach, the advantages of this modular approach include the fact that each pair of pages E and O on facing sides of each spread can be designed independently of the rest of the book, the only constraint being in the points of connection through the spine. In addition, if the same circuit board layout is used for all spreads in the book, the modular approach makes it possible to use the same core sheet 216, laminated with different printed material for different pages, for the entire book, thus again greatly decreasing the cost of printing individual circuit board layers.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus.

I claim:

1. An electronic book for identifying and describing printed information by audio signals in a sequentially organized manner, comprising:
   (a) a multiplicity of book leaves consisting of a continuous core sheet folded in accordion fashion to form pairs of adjacent segments, the inside folds of which are bound to constitute the book's spine, while the outside folds constitute the outer edges of the book's pages;
   (b) a continuous circuit board layer printed on one side of said continuous core sheet by means of flexible conductive ink;
   (c) printed information sheets laminated onto both sides of said book leaves for communicating visual information to a user;
   (d) a power source;
   (e) voice synthesizer means containing audio signal information corresponding to said printed information;
   (f) audio means coupled to said voice synthesizer means for communicating said audio signal information to a user viewing a page of the book, said audio means being responsive to a drive signal from said voice synthesizer means;
   (g) sequence control means for sequentially activating said voice synthesizer means to describe said printed information according to a predetermined sequence;
   (h) switching means associated with each page of the book and electrically connected to said power source and said sequence control means through said circuit board layer for activating said sequence control means to describe the printed information on said page being viewed by a user; and (i) means for covering and binding said multiplicity of laminated book leaves into multi-leaf book format;

wherein said circuit board layer is provided for electrical connection of said sequence control means and said power source with said switching means associated with each page of the book.

2. An electronic book for identifying and highlighting printed information by visual signals in a sequentially organized manner, comprising:

(a) a multiplicity of book leaves consisting of a continuous core sheet folded in accordion fashion to form pairs of adjacent segments, the inside folds of which are bound to constitute the book's spine, while the outside folds constitute the outer edges of the book's pages;

(b) a continuous circuit board layer printed on one side of said continuous core sheet by means of flexible conductive ink;

(c) printed information sheets laminated onto both sides of said book leaves for communicating visual information to a user;

(d) a multiplicity of light emitter diodes incorporated into said continuous circuit board layer and visible to a user through apertures in said printed information sheets;

(e) a power source;

(f) sequence control means for sequentially energizing said light emitter diodes to highlight said printed information on a page being viewed by a user according to a predetermined sequence;

(g) switching means associated with each page of the book and electrically connected to said power source and said sequence control means through said circuit board layer for activating said sequence control means to highlight the printed information on said page being viewed by a user; and (h) means for covering and binding said multiplicity of laminated book leaves into multi-leaf book format;

wherein said circuit board layer is provided for electrical connection of said sequence control means and said power source with said switching means associated with each page of the book.

3. An electronic book for identifying and highlighting printed information by visual signals in a sequentially organized manner and for further identifying and describing such printed information by synchronized audio signals, comprising:

(a) a multiplicity of book leaves consisting of a continuous core sheet folded in accordion fashion to form pairs of adjacent segments, wherein the inside folds of said continuous core sheet are bound to constitute the book's spine, while the outside folds constitute the outer edges of the book's pages;

(b) a continuous circuit board layer printed on one side of said continuous core sheet by means of flexible conductive ink;

(c) printed information sheets laminated onto both sides of said book leaves for communicating visual information to a user;

(d) a multiplicity of light emitter diodes incorporated into said continuous circuit board layer and visible to a user through apertures in said printed information sheets;

(e) a power source;

(f) voice synthesizer means containing audio signal information corresponding to said printed information;

(g) audio means coupled to said voice synthesizer means for communicating said audio signal information to a user, said audio means being responsive to a drive signal from said voice synthesizer means;

(h) sequence control means for sequentially energizing said light emitter diodes to highlight said printed information on a page being viewed by a user and for activating said voice synthesizer means to describe said printed information according to a predetermined sequence;

(i) synchronization control means for synchronizing the operation of said sequence control means so that the energizing of said light emitter diodes and the activation of said voice synthesizer means are synchronized according to a predetermined schedule of delivery;

(j) switching means associated with each page of the book and electrically connected to said power source and said sequence control means through said circuit board layer for activating said sequence control means to highlight and describe the printed information on said page being viewed by a user; and (k) means for covering and binding said multiplicity of laminated book leaves into multi-leaf book format;

wherein said circuit board layer is provided for electrical connection of said sequence control means and said power source with said switching means associated with each page of the book.

4. The electronic book described in claim 3, wherein said multiplicity of light emitter diodes incorporated into said continuous circuit board layer and visible to a user through apertures in said printed information sheets is manufactured by bonding semiconductor die chips directly into said continuous circuit board layer.

5. The electronic book described in claim 3, wherein said continuous circuit board layer is printed on the front side of said continuous core sheet by means of flexible conductive ink.

6. The electronic book described in claim 3, wherein said continuous circuit board layer is printed on the back side of said continuous core sheet by means of flexible conductive ink and wherein perforations are provided in said core sheet matching the sites of said multiplicity of light emitting diodes to make them visible from the front side.

7. The electronic book described in claim 3, wherein said power source consists of a battery.

8. The electronic book described in claim 3, wherein said audio means coupled to said voice synthesizer means for communicating said audio signal information to a user consists of a speaker.

9. The electronic book described in claim 3, wherein said audio means coupled to said voice synthesizer means for communicating said audio signal information to a user consists of headphones.

10. The electronic book described in claim 3, wherein said switching means for activating said sequence control means at a page being viewed by a user consists of electromechanical switches that extend from said printed circuit through said printed information sheets laminated onto both sides of said book leaves to initiate the operation of the electronic book when it is opened at that page.

11. The electronic book described in claim 3, wherein said switching means for activating said sequence control means at said page being viewed by a user consists of photo-sensitive switches that extend from said printed circuit through said printed information sheets laminated onto both sides of said book leaves to initiate the operation of the electronic book when it is opened at that page.

12. The electronic book described in claim 3, wherein said printed information sheets laminated onto both sides of said book leaves for communicating visual information to a user are translucent, thereby rendering said multiplicity of light emitter diodes incorporated into said continuous circuit board layer visible to a user without requiring corresponding apertures in said printed information sheets.

13. The electronic book described in claim 3, further comprising:
(l) a multiplicity of pressure switches incorporated into said continuous circuit board layer for connection with said sequence control means to provide the user with predetermined alternative progression options selected by applying pressure on recognizable features corresponding to said pressure switches in said printed information sheets.

14. An electronic book for identifying and highlighting printed information by visual signals in a sequentially organized manner and for further identifying and describing such printed information by synchronized audio signals, comprising:
(a) a multiplicity of book leaves, each leaf comprising a modular core sheet folded to form two opposite book pages;
(b) modular circuit board layers printed on the front side of said modular core sheets by means of flexible conductive ink and having electrical connections between said two opposite pages;
(c) a fan-like spine having flexible conductive circuitry printed thereon for receiving said multiplicity of book leaves, each leaf being sandwiched between corresponding flaps in said spine, wherein said electrical connections between said two opposite pages of each leaf are coupled to corresponding electrical paths in said spine;
(d) printed information sheets laminated onto both sides of said two opposite pages of said book leaves for communicating visual information to a user;
(e) a multiplicity of light emitter diodes incorporated into said modular circuit board layers and visible to a user through apertures in said printed information sheets;
(f) a power source;
(g) voice synthesizer means containing audio signal information corresponding to said printed information;
(h) audio means coupled to said voice synthesizer means for communicating said audio signal information to a user, said audio means being responsive to a drive signal from said voice synthesizer means;
(i) sequence control means for sequentially energizing said light emitter diodes to highlight said printed information on a page being viewed by a user and for activating said voice synthesizer means to describe said printed information according to a predetermined sequence;
(j) synchronization control means for synchronizing the operation of said sequence control means so that the energizing of said light emitter diodes and the activation of said voice synthesizer means are synchronized according to a predetermined schedule of delivery;
(k) switching means associated with each page of the book and electrically connected to said power source and said sequence control means through said modular circuit board layers and spine for activating said sequence control means to highlight and describe the printed information on said page being viewed by a user; and
(l) means for covering and binding said multiplicity of laminated book leaves and said fan-like spine into multi-leaf book format;
wherein said modular circuit board layers and said flexible conductive circuitry in said fan-like spine are provided for electrical connection of said sequence control means and said power source with said switching means associated with each page of the book.

15. The electronic book described in claim 14, wherein said multiplicity of light emitter diodes incorporated into said modular circuit board layers and visible to a user through apertures in said printed information sheets is manufactured by bonding semiconductor die chips directly into said modular circuit board layers.

16. The electronic book described in claim 14, wherein said power source consists of a battery.

17. The electronic book described in claim 14, wherein said audio means coupled to said voice synthesizer means for communicating said audio signal information to a user consists of a speaker.

18. The electronic book described in claim 14, wherein said audio means coupled to said voice synthesizer means for communicating said audio signal information to a user consists of headphones.

19. The electronic book described in claim 14, wherein said switching means for activating said sequence control means at a page being viewed by a user consists of electromechanical switches that extend from said circuit board layers through said printed information sheets laminated onto both sides of said book leaves to initiate the operation of the electronic book when it is opened at that page.

20. The electronic book described in claim 14, wherein said switching means for activating said sequence control means at said page being viewed by a user consists of photo-sensitive switches that extend from said circuit board layers through said printed information sheets laminated onto both sides of said book leaves to initiate the operation of the electronic book when it is opened at that page.

21. The electronic book described in claim 14, wherein said printed information sheets laminated onto both sides of said book leaves for communicating visual information to a user are translucent, thereby rendering said multiplicity of light emitter diodes incorporated into said modular circuit board layers visible to a user without regarding corresponding apertures in said printed information sheets.

22. The electronic book described in claim 14, further comprising:
(m) a multiplicity of pressure switches incorporated into said modular circuit board layers for connection with said sequence control means to provide the user with predetermined alternative progression options selected by applying pressure on recognizable features corresponding to said pressure switches in said printed information sheets.

23. An electronic book for identifying and highlighting printed information by visual signals in a sequentially organized manner and for further identifying and describing such printed information by synchronized audio signals, comprising:
- (a) a multiplicity of book spreads assembled into book leaves, each spread comprising a modular core sheet folded to form two facing book pages;
- (b) modular circuit board layers printed on the back side of said modular core sheets by means of flexible conductive ink and having electrical connections between said two facing pages;
- (c) a fan-like spine having flexible conductive circuitry printed thereon for receiving said multiplicity of book spreads, each spread being sandwiched between corresponding flaps in said spine, wherein said electrical connections between said two facing pages of each spread are coupled to corresponding electrical paths in the spine;
- (d) printed information sheets laminated onto both sides of said two facing pages of said book spreads for communicating visual information to a user;
- (e) a multiplicity of light emitter diodes incorporated into said modular circuit board layers and visible to a user through apertures in said printed information sheets and through perforations in said modular core sheets;
- (f) a power source;
- (g) voice synthesizer means containing audio signal information corresponding to said printed information;
- (h) audio means coupled to said voice synthesizer means for communicating said audio signal information to a user, said audio means being responsive to a drive signal from said voice synthesizer means;
- (i) sequence control means for sequentially energizing said light emitter diodes to highlight said printed information on a page being viewed by a user and for activating said voice synthesizer means to describe said printed information according to a predetermined sequence;
- (j) synchronization control means for synchronizing the operation of said sequence control means so that the energizing of said light emitter diodes and the activation of said voice synthesizer means are synchronized according to a predetermined schedule of delivery;
- (k) switching means associated with each page of the book and electrically connected to said power source and said sequence control means through said modular circuit board layers and spine for activating said sequence control means to highlight and describe the printed information on said page being viewed by a user; and
- (l) means for covering and binding said multiplicity of laminated book spreads assembled into book leaves and said fan-like spine into multi-leaf book format;

wherein said modular circuit board layers and said flexible conductive circuitry in said fan-like spine are provided for electrical connection of said sequence control means and said power source with said switching means associated with each page of the book.

24. The electronic book described in claim 23, wherein said multiplicity of light emitter diodes incorporated into said modular circuit board layers and visible to a user through apertures in said printed information sheets are manufactured by bonding semiconductor die chips directly into said modular circuit board layers.

25. The electronic book described in claim 23, wherein said power source consists of a battery.

26. The electronic book described in claim 23, wherein said audio means coupled to said voice synthesizer means for communicating said audio signal information to a user consists of a speaker.

27. The electronic book described in claim 23, wherein said audio means coupled to said voice synthesizer means for communicating said audio signal information to a user consists of headphones.

28. The electronic book described in claim 23, wherein said switching means for activating said sequence control means at a page being viewed by a user consists of electromechanical switches that extend from said circuit board layers through said printed information sheets laminated onto both sides of said book spreads to initiate the operation of the electronic book when it is opened at that page.

29. The electronic book described in claim 23, wherein said switching means for activating said sequence control means at said page being viewed by a user consists of photo-sensitive switches that extend from said circuit board layers through said printed information sheets laminated onto both sides of said book spreads to initiate the operation of the electronic book when it is opened at that page.

30. The electronic book described in claim 23, wherein said printed information sheets laminated onto both sides of said book leaves for communicating visual information to a user are translucent, thereby rendering said multiplicity of light emitter diodes incorporated into said modular circuit board layers visible to a user without requiring corresponding apertures in said printed information sheets.

31. The electronic book described in claim 23, further comprising:
- (m) a multiplicity of pressure switches incorporated into said modular circuit board layers for connection with said sequence control means to provide the user with predetermined alternative progression options selected by applying pressure on recognizable features corresponding to said pressure switches in said printed information sheets.

32. A method for constructing an electronic book for identifying and highlighting printed information by visual signals in a sequentially organized manner and for further identifying and describing such printed information by synchronized audio signals, comprising the steps of:
- (a) providing a multiplicity of book leaves consisting of a continuous core sheet folded in accordion fashion to form pairs of adjacent segments, wherein the inside folds are bound to constitute the book's spine, while the outside folds constitute the outer edges of the book's pages;
- (b) printing a continuous circuit board layer on one side of said continuous core sheet by means of flexible conductive ink;
- (c) laminating printed information sheets onto both sides of said book leaves for communicating visual information to a user;
- (d) incorporating a multiplicity of light emitter diodes into said continuous circuit board layer, said diodes being visible to a user through apertures in said printed information sheets;
- (e) providing a power source;

(f) providing voice synthesizer means containing audio signal information corresponding to said printed information;

(g) providing audio means coupled to said voice synthesizer means for communicating said audio signal information to a user, said audio means being responsive to a drive signal from said voice synthesizer means;

(h) providing sequence control means for sequentially energizing said light emitter diodes to highlight said printed information on a page being viewed by a user and for activating said voice synthesizer means to describe said printed information according to a predetermined sequence;

(i) providing synchronization control means for synchronizing the operation of said sequence control means so that the energizing of said light emitter diodes and the activation of said voice synthesizer means are synchronized according to a predetermined schedule of delivery;

(h) providing switching means associated with each page of the book and electrically connected to said power source and said sequence control means through said continuous circuit board layer for activating said sequence control means to describe the printed information on said page being viewed by a user; and (k) covering and binding said multiplicity of laminated book leaves into multi-leaf book format;

wherein said continuous circuit board layer is provided for electrical connection of said sequence control means and said power source with said switching means associated with each page of the book.

33. The method described in claim 32, further comprising the step of:

(l) providing a multiplicity of pressure switches incorporated into said continuous circuit board layer for connection with said sequence control means to provide the user with predetermined alternative progression options selected by applying pressure on recognizable features corresponding to said pressure switches in said printed information sheets.

34. A method for constructing an electronic book for identifying and highlighting printed information by visual signals in a sequentially organized manner and for further identifying and describing such printed information by synchronized audio signals, comprising the steps of:

(a) providing a multiplicity of book leaves, each leaf comprising a modular core sheet folded to form two opposite book pages;

(b) printing modular circuit board layers on the front side of said modular core sheets by means of flexible conductive ink and having electrical connections between said two opposite pages;

(c) sandwiching each leaf of said multiplicity of book leaves between corresponding flaps of a fan-like spine, wherein said electrical connections between said two opposite pages of each leaf are coupled to corresponding electrical paths in said spine;

(d) laminating printed information sheets onto both sides of said two opposite pages of said book leaves for communicating visual information to a user;

(e) incorporating a multiplicity of light emitter diodes into said modular circuit board layers, said diodes being visible to a user through apertures in said printed information sheets;

(f) providing a power source;

(g) providing voice synthesizer means containing audio signal information corresponding to said printed information;

(h) providing audio means coupled to said voice synthesizer means for communicating said audio signal information to a user, said audio means being responsive to a drive signal from said voice synthesizer means;

(i) providing sequence control means for sequentially energizing said light emitter diodes to highlight said printed information on a page being viewed by a user and for activating said voice synthesizer means to describe said printed information according to a predetermined sequence;

(j) providing synchronization control means for synchronizing the operation of said sequence control means so that the energizing of said light emitter diodes and the activation of said voice synthesizer means are synchronized according to a predetermined schedule of delivery;

(k) providing switching means associated with each page of the book and electrically connected to said power source and said sequence control means through said modular circuit board layers and spine for activating said sequence control means to highlight and describe the printed information on said page being viewed by a user; and (l) covering and binding said multiplicity of laminated book leaves and said fan-like spine into multi-leaf book format;

wherein said modular circuit board layers are provided for electrical connection of said sequence control means and said power source with said switching means associated with each page of the book.

35. The method described in claim 34, further comprising the step of:

(m) providing a multiplicity of pressure switches incorporated into said modular circuit board layers for connection with said sequence control means to provide the user with predetermined alternative progression options selected by applying pressure on recognizable features corresponding to said pressure switches in said printed information sheets.

36. A method for constructing an electronic book for identifying and highlighting printed information by visual signals in a sequentially organized manner and for further identifying and describing such printed information by synchronized audio signals, comprising the steps of:

(a) providing a multiplicity of book spreads assembled into book leaves, each spread comprising a modular core sheet folded to form two facing book pages;

(b) printing modular circuit board layers on the back side of said modular core sheets by means of flexible conductive ink and having electrical connections between said two facing pages;

(c) providing a fan-like spine having flexible conductive circuitry printed thereon for receiving said multiplicity of book spreads, each spread being sandwiched between corresponding flaps in said spine, wherein said electrical connections between said two facing pages of each spread are coupled to corresponding electrical paths in the spine;

(d) laminating printed information sheets onto both sides of said two facing pages of said book spreads for communicating visual information to a user;

(e) incorporating a multiplicity of light emitter diodes into said modular circuit board layers, said diodes being visible to a user through apertures in said printed information sheets and through perforations in said modular core sheets;

(f) providing a power source;

(g) providing voice synthesizer means containing audio signal information corresponding to said printed information;

(h) providing audio means coupled to said voice synthesizer means for communicating said audio signal information to a user, said audio means being responsive to a drive signal from said voice synthesizer means;

(i) providing sequence control means for sequentially energizing said light emitter diodes to highlight said printed information on a page being viewed by a user and for activating said voice synthesizer means to describe said printed information according to a predetermined sequence;

(j) providing synchronization control means for synchronizing the operation of said sequence control means so that the energizing of said light emitter diodes and the activation of said voice synthesizer means are synchronized according to a predetermined schedule of delivery;

(k) providing switching means associated with each page of the book and electrically connected to said power source and said sequence control means through said modular circuit board layers and spine for activating said sequence control means to highlight and describe the printed information on said page being viewed by a user; and (l) covering and binding said multiplicity of laminated book spreads assembled into book leaves and said fan-like spine into multi-leaf book format;

wherein said circuit board layers and said flexible conductive circuitry in said fan-like spine are provided for electrical connection of said sequence control means and said power source with said switching means associated with each page of the book.

37. The method described in claim 36, further comprising the step of:

(m) providing a multiplicity of pressure switches incorporated into said modular circuit board layers for connection with said sequence control means to provide the user with predetermined alternative progression options selected by applying pressure on recognizable features corresponding to said pressure switches in said printed information sheets.

* * * * *